US 9,223,831 B2

(12) United States Patent
Baker et al.

(10) Patent No.: US 9,223,831 B2
(45) Date of Patent: Dec. 29, 2015

(54) SYSTEM, METHOD AND COMPUTER PROGRAM PRODUCT FOR SEARCHING SUMMARIES OF MOBILE APPS REVIEWS

(71) Applicant: CODEQ LLC, Apex, NC (US)

(72) Inventors: Douglas Dane Baker, Cary, NC (US); Brian Fernandes, San Diego, CA (US); Paulo Malvar Fernandez, La Mesa, CA (US); Muhammad Abdul-Mageed, Bloomington, IN (US)

(73) Assignee: CODEQ LLC, Apex, NC (US)

( * ) Notice: Subject to any disclaimer, the term of this patent is extended or adjusted under 35 U.S.C. 154(b) by 85 days.

(21) Appl. No.: 13/732,880

(22) Filed: Jan. 2, 2013

(65) Prior Publication Data

US 2014/0188897 A1    Jul. 3, 2014

(51) Int. Cl.

| | |
|---|---|
| G06F 7/00 | (2006.01) |
| G06F 17/30 | (2006.01) |
| G06Q 30/00 | (2012.01) |
| G06Q 30/06 | (2012.01) |
| G06F 15/16 | (2006.01) |

(52) U.S. Cl.
CPC ........ *G06F 17/3053* (2013.01); *G06Q 30/0623* (2013.01); *G06Q 30/0631* (2013.01); *Y10S 707/944* (2013.01)

(58) Field of Classification Search
CPC .......................... G06F 17/3053; Y10S 707/944
USPC .................................. 707/748, 944; 705/26.7
See application file for complete search history.

(56) References Cited

U.S. PATENT DOCUMENTS

| | | | | |
|---|---|---|---|---|
| 5,974,412 | A * | 10/1999 | Hazlehurst et al. ..... | 707/999.003 |
| 6,523,026 | B1 * | 2/2003 | Gillis ..................... | 707/999.003 |
| 7,630,986 | B1 * | 12/2009 | Herz et al. ............... | 707/999.01 |
| 8,230,016 | B1 | 7/2012 | Pattan | |
| 8,626,771 | B2 * | 1/2014 | Fowler et al. .................. | 707/748 |
| 2010/0312769 | A1* | 12/2010 | Bailey et al. ................... | 707/741 |
| 2011/0246181 | A1* | 10/2011 | Liang et al. ........................ | 704/9 |

(Continued)

OTHER PUBLICATIONS

Sasha Blair-Goldensohn, Kerry Hannan, Ryan McDonald, Tyler Neylon, George A. Reis and Jeff Reynar. Building a Sentiment Summarizer for Local Service Reviews. WWW 2008 Workshop: NLP in the Information Explosion Era. NLPIX2008, Beijing, China, Apr. 22, 2008.*

(Continued)

*Primary Examiner* — Usmaan Saeed
*Assistant Examiner* — Brian E. Weinrich
(74) *Attorney, Agent, or Firm* — Hunton & Williams LLP

(57) ABSTRACT

A system, method, and computer program product (e.g. mobile App) and/or web-based service is provided to enable users to research online reviews in order to assess the performance and functionality of mobile applications. The system extracts reviews from multiple online sources, including: mobile Apps "stores", blogs, online magazines, websites, etc.; and, utilizes sentiment analysis algorithms and supervised machine learning analysis to present more informative summaries for each App's reviews. Summaries may include: a sentence that encapsulates a sentiment held by many users; the most positive and negative comments; and a list of features with average scores (e.g. graphics, fun, easy to use, etc.). Additionally, the user may view a separate review detail page per App that provides further summaries, such as a short list of other Apps that the same reviewer gave a very positive review for the features. The user is then able to purchase and download the App via a link.

18 Claims, 10 Drawing Sheets

(56) References Cited

U.S. PATENT DOCUMENTS

| | | | |
|---|---|---|---|
| 2012/0072283 A1* | 3/2012 | DeVore et al. | 705/14.49 |
| 2012/0072312 A1* | 3/2012 | Lange et al. | 705/27.1 |
| 2012/0084292 A1* | 4/2012 | Liang et al. | 707/741 |
| 2012/0116905 A1* | 5/2012 | Futty et al. | 705/26.1 |
| 2012/0290910 A1* | 11/2012 | Kumar et al. | 707/748 |
| 2014/0156660 A1* | 6/2014 | Arbon et al. | 707/737 |
| 2014/0164302 A1* | 6/2014 | Di Fabbrizio et al. | 706/46 |
| 2014/0172412 A1* | 6/2014 | Viegas et al. | 704/9 |

OTHER PUBLICATIONS

Blair-Goldensohn, S., Hannan, K., McDonald, R., Neylon, T., Reis, G.A., Reynar, J. "Building a sentiment summarizer for local service reviews.", WWW Workshop on NLP in the Information Explosion Era (2008).

Screen shot of an Amazon's company webpage image of summaries on books posted on Droplr website: http://i.elpt.ms/MPjp/511ofIGZ, (undated).

Abdul-Mageed, M. & Diab, M. (2014). SANA: A Large Scale, Multi-Genre, Multi-Dialect Lexicon for Arabic Sentiment Analysis. The 9th International Conference on Language Resources and Evaluation (LREC2014), May 26-31, Reykjavik, Iceland.

Abdul-Mageed, Muhammad, Mona T. Diab, and Mohammed Korayem. "Subjectivity and sentiment analysis of modern standard arabic." Proceedings of the 49th Annual Meeting of the Association for Computational Linguistics: Human Language Technologies: short papers—vol. 2. Association for Computational Linguistics, 2011.

Archak, N., Ghose, A., & Ipeirotis, P. G. (2007). Show me the money!: deriving the pricing power of product features by mining consumer reviews. Proceedings of the 13th ACM SIGKDD International Conference on Knowledge Discovery and Data Mining, 56-65.

Blair-Goldensohn, S., Hannan, K., McDonald, R., Neylon, T., Reis, G. A., & Reynar, J. (2008). Building a sentiment summarizer for local service reviews. WWW Workshop on NLP in the Information Explosion Era.

Carenini, G., Ng, R., & Zwart, E. (2005). Extracting knowledge from evaluative text. Proceedings of the 3rd International Conference on Knowledge Capture, 11-18.

Jindal, N., & Liu, B. (2006). Identifying comparative sentences in text documents. Proceedings of the 29th Annual International ACM SIGIR Conference on Research and Development in Information Retrieval, 244-251.

Joachims, T. (2002). Learning to classify text using support vector machines: Methods, theory, and algorithms. Computational Linguistics, 29(4), 656-664.

Hu, M., & Liu, B. (2004). Mining opinion features in customer reviews. Proceedings of the National Conference on Artificial Intelligence, 755-760.

Hu, M., & Liu, B. (2004). Mining and summarizing customer reviews. Proceedings of the Tenth ACM SIGKDD International Conference on Knowledge Discovery and Data Mining, 168-177.

Kim, S., & Hovy, E. (2006). Automatic identification of pro and con reasons in online reviews. Proceedings of the COLING/ACL on Main Conference Poster Sessions, 483-490.

Lin, C., & Hovy, E. (1997). Identifying topics by position. Proceedings of the Fifth Conference on Applied Natural Language Processing, 283-290.

Liu, B., Hu, M., & Cheng, J. (2005). Opinion observer: Analyzing and comparing opinions on the web. Proceedings of the 14th International Conference on World Wide Web, 342-351.

Madani, O., & Yu, J. (2010). Discovery of numerous specific topics via term co-occurrence analysis (pp. 1-33). Presented at the CIKM '10: Proceedings of the 19th ACM international conference on Information and knowledge management, ACM Request Permissions.

Mullen, T., & Malouf, R. (2006). A Preliminary Investigation into Sentiment Analysis of Informal Political Discourse. In AAAI Spring Symposium: Computational Approaches to Analyzing Weblogs (pp. 159-162).

Ng, V., Dasgupta, S., & Arifin, S. M. (2006). Examining the role of linguistic knowledge sources in the automatic identification and classification of reviews. In Proceedings of the COLING/ACL on Main conference poster sessions (pp. 611-618). Association for Computational Linguistics.

Pang, B., & Lee, L. (Jul. 2004). A sentimental education: Sentiment analysis using subjectivity summarization based on minimum cuts. In Proceedings of the 42nd annual meeting on Association for Computational Linguistics (p. 271). Association for Computational Linguistics.

Pang, B., Lee, L., & Vaithyanathan, S. (Jul. 2002). Thumbs up?: sentiment classification using machine learning techniques. In Proceedings of the ACL-02 conference on Empirical methods in natural language processing—vol. 10 (pp. 79-86). Association for Computational Linguistics.

Sebastiani, F. (2002). Machine learning in automated text categorization. ACM computing surveys (CSUR), 34(1), 1-47.

Shi, B., & Chang, K. (2006). Mining chinese reviews. ICDM Workshops 2006. Sixth IEEE International Conference on Data Mining Workshops, 585-589.

Somprasertsri, G., & Lalitrojwong, P. (2008). Automatic product feature extraction from online product reviews using maximum entropy with lexical and syntactic features. Information Reuse and Integration, 2008. IRI 2008. IEEE International Conference on, 250-255.

Somprasertsri, G., & Lalitrojwong, P. (2010). Extracting product features and opinions from product reviews using dependency analysis. Fuzzy Systems and Knowledge Discovery (FSKD), 2010 Seventh International Conference on, 5, 2358-2362.

Sun, A. (2012). Short text classification using very few words. Presented at the SIGIR '12: Proceedings of the 35th international ACM SIGIR conference on Research and development in information retrieval, ACM.

Wilson, T., Wiebe, J., & Hoffmann, P. (2009). Recognizing contextual polarity: An exploration of features for phrase-level sentiment analysis. Computational linguistics, 35(3), 399-433.

Wilson, T., Wiebe, J., & Hoffmann, P. (Oct. 2005). Recognizing contextual polarity in phrase-level sentiment analysis. In Proceedings of the conference on human language technology and empirical methods in natural language processing (pp. 347-354). Association for Computational Linguistics.

Phan, X. H., Nguyen, L. M., & Horiguchi, S. (2008). Learning to classify short and sparse text & web with hidden topics from large-scale data collections, 91-100.

Zhuang, L., Jing, F., & Zhu, X. (2006). Movie review mining and summarization. Proceedings of the 15th ACM International Conference on Information and Knowledge Management, 43-50.

Pang, B., & Lee, L. (2008). Opinion Mining and Sentiment Analysis (vol. 2, pp. 1-135). Foundations and Trends in Information Retrieval.

\* cited by examiner

SYSTEM, METHOD AND COMPUTER PROGRAM PRODUCT FOR SEARCHING SUMMARIES OF MOBILE APPS REVIEWS

FIELD OF THE INVENTION

The present invention relates to a web-based interface to assist users in selecting mobile apps based upon a computer implemented analysis of multiple reviews of the apps.

BACKGROUND OF THE INVENTION

The online tools currently provided to display and view the millions of user reviews of mobile applications (Apps) are limited. Generally a user can only retrieve a listing of user reviews and at best sort them by a rating that the user gives to an App in addition to the review text submitted. There has been very little done with regard to analyzing the review text directly for relevant details to provide to the end user evaluating an App's reviews to determine if s/he wants to download and install the App.

For example, US Patent Application 20120072312, entitled "Curated Application Store", permits a user to rate a mobile application on a scale of 1 to 5 star; and US Patent Application 20120072283 entitled "Mobile Application Recommendation System and Method" permits a user to see the hottest trending App's. Neither system calculates a rating from multiple reviewers for the mobile application as a whole, or any particular feature of the application.

Similarly, US Patent Application 20120116905, entitled "Application Store Taskmaster Recommendation" discloses a computerized system for user's to poll their friends for recommendations on mobile applications, wherein the results comprise ranking the recommended applications while not evaluating particular features within the App.

And while U.S. Pat. No. 8,230,016, entitled "Determining intent of a recommendation of a mobile application" discloses a system for disclosing features of a mobile application that a user likes, it does not conduct an analysis combining the recommendations of multiple users to identify the most positive and negative features of a particular App.

These applications do not disclose comparing and contrasting different mobile applications using statistical analysis or other computing methods to highlight the most positive and most negative features of a mobile application as determined by multiple reviewers, and to quantify the ratings of the particular features; as well as to provide separate displays of reviews by professional information technology reviewers versus non-technical user reviewers.

Neither do these systems provide a cross-referencing feature to display other mobile applications: 1) that a reviewer rated as highly as the application that the user is investigating in order for them to comparison shop; nor 2) that a reviewer who gave a negative rating to the user's application of interest, alternatively rated other applications highly in order for the user to find a better performing application.

SUMMARY OF THE INVENTION

The present invention provides the CrowdChunk system, method and computer program product (e.g. mobile App) and/or web-based service (e.g. webpage) to enable users to search for and select mobile Apps after viewing summaries of users' reviews (i.e. "reviewers") that are pulled from various online sources comprising: mobile Apps "stores", blogs, online magazines, web sites, online reviews by IT professionals, etc. The system utilizes opinion/sentiment analysis algorithms and supervised machine learning to present more informative summaries for each app's reviews comprising data analysis and metrics of rated features of an app, such as the quality of the graphics, and the ease-of-use. The user may then click a link to purchase the app from the original source (e.g. Apple App Store). In an alternative embodiment, the user may purchase the app from the CrowdChunk webpage.

In a preferred embodiment, the user may view one or more of the following "Summaries" from the system analysis for a particular app the user is interested in downloading to their mobile device (e.g. iPhone):

1) A section containing one or more summary sentences from a reviewer that encapsulates a sentiment held by many reviewers, and displays that sentence in quotes and states, for example, "[x] of users out of [y] made a similar statement".
2) The most positive and/or negative reviews comprising a list of 2 or more pulled quotes culled from the reviews that the CrowdChunk system CPU determines are the most positive and/or negative reviews (e.g. "Most positive review: 'Runs very fast'"; and, "Most negative review: 'Crashes often'").
3) A list of features extracted from the reviews with the average score as calculated by the system CPU next to them (e.g. Graphics 80%, Easy to Use 10%, Fun factor 40%).
4) A separate Review Detail Page for the app of interest (shown when the user clicks on a link within (1), (2), or (3) above), comprising a "Positive" or "Negative" score for each feature extracted. The Review Detail Page may also comprise an "App Review Cross-Referencing Feature" providing a list of other apps that a reviewer who: 1) gave a high rating to the user's searched app, also gave a high rating to the apps on the list; and 2) gave a low rating to the user's searched app, but gave a high rating to similar apps on the list.
5) A Professional Reviews Page comprising a listing of reviews extracted from online sources published by IT professionals who evaluate the functionality of an app. Sources of the professional reviews may comprise, for example, IT professional blogs, online magazines, web-sites, etc.

The opinion/sentiment analysis algorithms and machine learning methods comprise primarily three main computer processes/subsystems/modules: 1) Review extraction and storage (aka "Review Scraper"); 2) Sentiment Analysis and Feature Extraction (SAFE); and 3) Query Interface Web Application. During Review extraction and storage, the system makes HTTP requests to an online Apps store (e.g. the Apple web-based store) to retrieve all user submitted reviews for every App for that particular mobile device operating system (e.g. iOS for Apple, Android for Samsung, etc.). These reviews are stored in a relational database after preprocessing, in a format that can be used as input to the Sentiment Analysis and Feature Extraction (SAFE) subsystem. The Review Scraper subsystem can also be configured to retrieve data from other sources of reviews comprising IT professional reviews. The Review Scraper subsystem will also periodically retrieve review data from the above mentioned data sources to keep the system's database of Review data up-to-date. The frequency of updating the review data is configurable, and may comprise, for example, daily to once per week system updating.

Sentiment Analysis and Feature Extraction (SAFE) retrieves the prepossessed reviews from the Review database and subsequently performs lexical analysis and supervised machine learning analysis to create summaries of the reviews comprising statistical analysis and metrics calculated by the CrowdChunk CPU for various features of a particular app that the user is researching. As disclosed in a preferred embodiment supra, the Summaries may comprise, for example: a sentence that encapsulates a sentiment held by many users; the most positive and negative comments; and a list of extracted features with average scores (e.g. graphics, fun, easy to use, etc.). Additionally, the Summaries may comprise cross-referencing details to other apps, such as a short list of other apps (with its commercial name and icon) that: 1) a reviewer who gave a positive rating to the user's app of interest, also rated highly in order to comparison shop; and 2) a reviewer who gave a negative rating to the user's app of interest, alternative rated other apps highly in order to find a better performing app. These SAFE derived Summaries are subsequently stored in the system's Review Analytics Database.

The user then uses the Query Interface Web Application to search for the SAFE Summaries in the Review Analytics Database. This may comprise a computer program product of the present invention as a mobile App, or a web-based service (e.g. website) to conduct the search and view the retrieved summaries. The user is also able to use the Query Interface Web Application to click on a link to purchase the app from its original source (e.g. app store).

BRIEF DESCRIPTION OF THE DRAWINGS

The above and other features, aspects, and advantages of the present invention will become better understood with regard to the following description, appended claims, and accompanying drawings where:

DETAILED DESCRIPTION

Glossary of Terms

Figure 1:
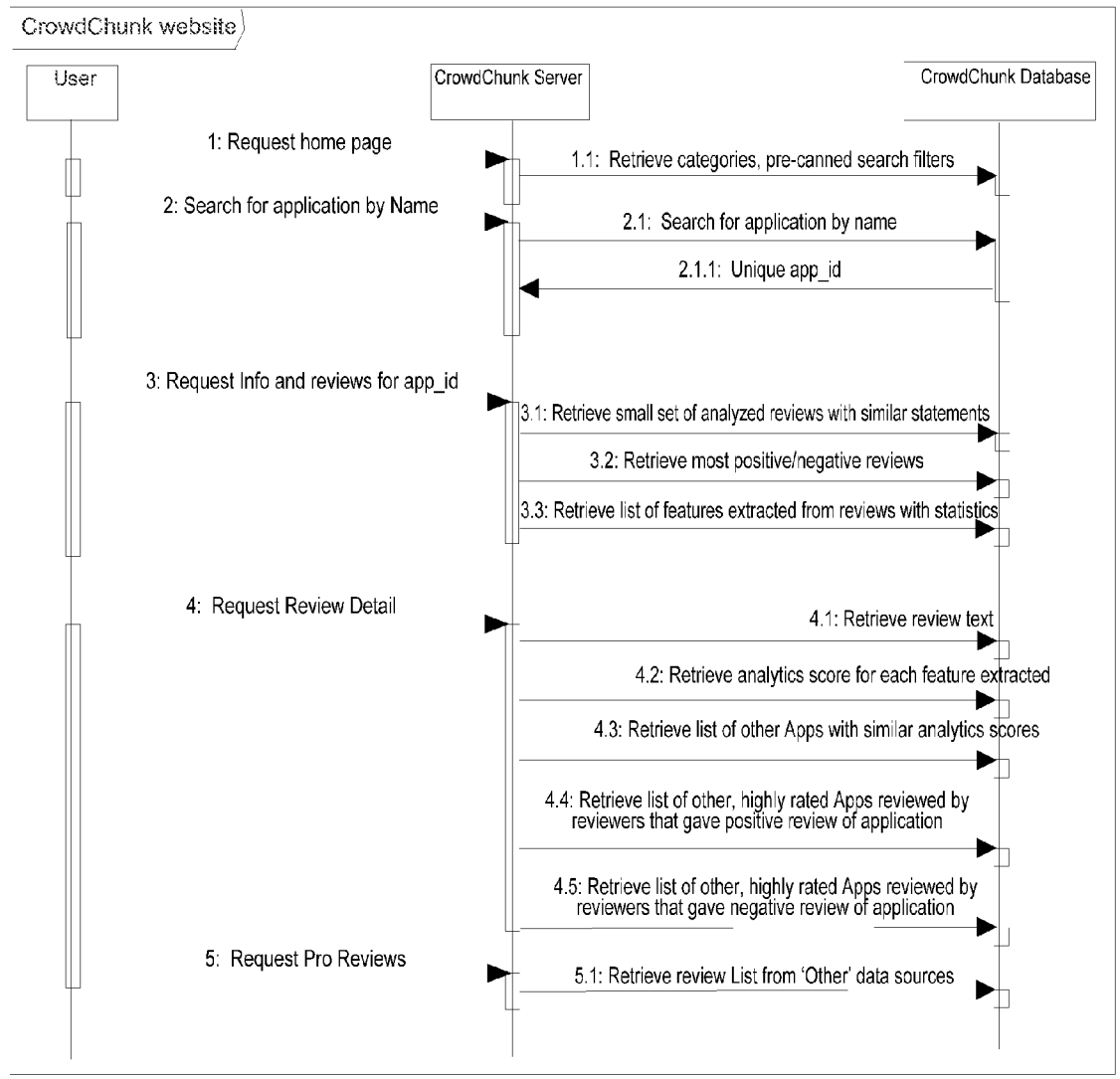
FIG. 1 is a Unified Modeling Language (UML) sequence diagram for the steps of the user inputting a search for a particular type of App, and the system server responding to the request with analyzed metrics of relevant Apps.

As used herein, the term "Client Electronic Computing Device" refers to any user electronic device comprising a central processing unit (i.e. processor) with the ability to transmit and receive electronic communications comprising via Internet and/or cellular connectivity, such as: laptops, desktops, tablets, iPads, iPods, smartphones, cell phones, and personal digital assistant devices. In a preferred embodiment, the user's device is an iOS Internet-enabled device to permit the user to purchase and download the app identified in the search of the system database. It is noted, though, that any Internet-enabled mobile or non-mobile device of any type of operating system may search for apps on the system database via the website of the present invention.

As used herein, the term "A System" may be used to claim all aspects of the present invention wherein it refers to the entire configuration of hardware and software in all embodiments. In a preferred embodiment, the "system" comprises a user computing device with Internet connectivity (e.g. laptops, tablets, smartphones, etc.). In an alternative embodiment of the present invention, the system comprises a client-server architecture comprising a user computing device with Internet connectivity, such as laptops, tablets, and smartphones, to communicate with a system server via a network, wherein the software of the present invention is installed on the system server and electronically communicates with the user's device over the Internet. Furthermore, the user's computing device may have modules of the present invention installed to assist in the student's learning exercise and redemption of a reward for completing the exercise.

As used herein the term "Server" computer refers to any computing device that collects and stores the app records on a database and executes the software programs of the present invention to search the database for an app with user desired features. The server system also facilitates the collection and distribution of content (e.g. reviews) to and from a multiplicity of computers and servers.

As used herein, the term "Software" refers to computer program instructions adapted for execution by a hardware element, such as a processor, wherein the instruction comprise commands that when executed cause the processor to perform a corresponding set of commands. The software may be written or coded using a programming language, and stored using any type of non-transitory computer-readable media or machine-readable media well known in the art. Examples of software in the present invention comprise any software components, programs, applications, computer programs, application programs, system programs, machine programs, and operating system software.

As used herein, the term "Module" or "Subsystem" refers to a portion of a computer program or software that carries out a specific function (e.g. Review Scraper module, SAFE module, etc.) and may be used alone or combined with other algorithms/modules of the same program. The programs may be stored on non-transitory computer-readable media to enable computers and/or computer systems to carry our part or all of the methods encoded therein.

As used herein, the term "App" or "app" refers to application software downloaded to a mobile device via the Internet. The computer software is designed to help the user perform specific tasks on or from their mobile device (e.g. view weather predictions).

As used herein, the term "Network" refers to any public network such as the Internet or World Wide Web or any public or private network as may be developed in the future which provides a similar service as the present Internet.

As used herein, the term "Reviewer" refers to any entity (person, organization, etc.) that publishes a critique of a mobile app. In a preferred embodiment, the publication is downloaded online by the CrowdChunk system server from one or more of the following: an app store website review repository, an app store enterprise partner data feed, and professional reviews (e.g. blogs, online magazines, websites that provide reviews of mobile apps, etc.).

As used herein, the term "User" refers to the entity who is utilizing the analytics and metrics computed by the CrowdChunk system server via the Query Interface Web Application as viewed from their mobile app or a web browser (e.g. on their laptop) in order to research an app that they are interested in.

General User and Server Steps

As illustrated in FIG. 1, the user interacts with the CrowdChunk system server via the Query Interface Web Application (FIG. 2B, 800) for the method of searching, selecting, and viewing the analytics summary of a particular application (app) that they are interested in potentially purchasing. The user's steps are initiated (see FIG. 1, step 1) with the user navigating to the CrowdChunk home page on the mobile app (computer program product) or the webpage of the present invention. The CrowdChunk server will subsequently retrieve app categories and pre-canned search filters (e.g. "What's Trending", "All-time Greats", "On Sale", etc.) to enable the user to search for a mobile app by its commercial name or by a general category of intended use of the app (FIG. 1, steps 1.1, 2, 2.1, 2.1.1). The user then requests information and reviews for the app of interest (FIG. 1, step 3), which the system server will retrieve from the Review Analytics Database (shown in FIGS. 2A & 2B, 250) comprising: i) a small set of analyzed reviews with similar statements (step 3.1); ii) the most positive/negative reviews (step 3.2); iii) a list of features extracted from reviews of statistics (step 3.3). The user may then request more details of a particular review (FIG. 1, step 4) and the system will retrieve: i) review text (step 4.1); ii) an analytics score for each feature extracted and computed by the CPU of the CrowdChunk server (step 4.2); and iii) a list of other Apps with similar analytics scores (step 4.3). The user can also exercise the "cross referencing" feature in step 4.4 of retrieving a list of other highly rated apps reviewed by other user(s) ("reviewer(s)") who gave positive reviews to the app the user is interested in. And in step 4.5 the user can retrieve a list of other highly rated apps reviewed by other user(s) who gave a negative review to the app the user is interested in. The user may also request Professional Reviews written by information technology experts (FIG. 1, step 5), and the system will retrieve a review list from "Other" data sources (e.g. blogs, online consumer and technical articles, websites, etc.) (step 5.1).

System Architecture and Data Flow

Figure 2A:
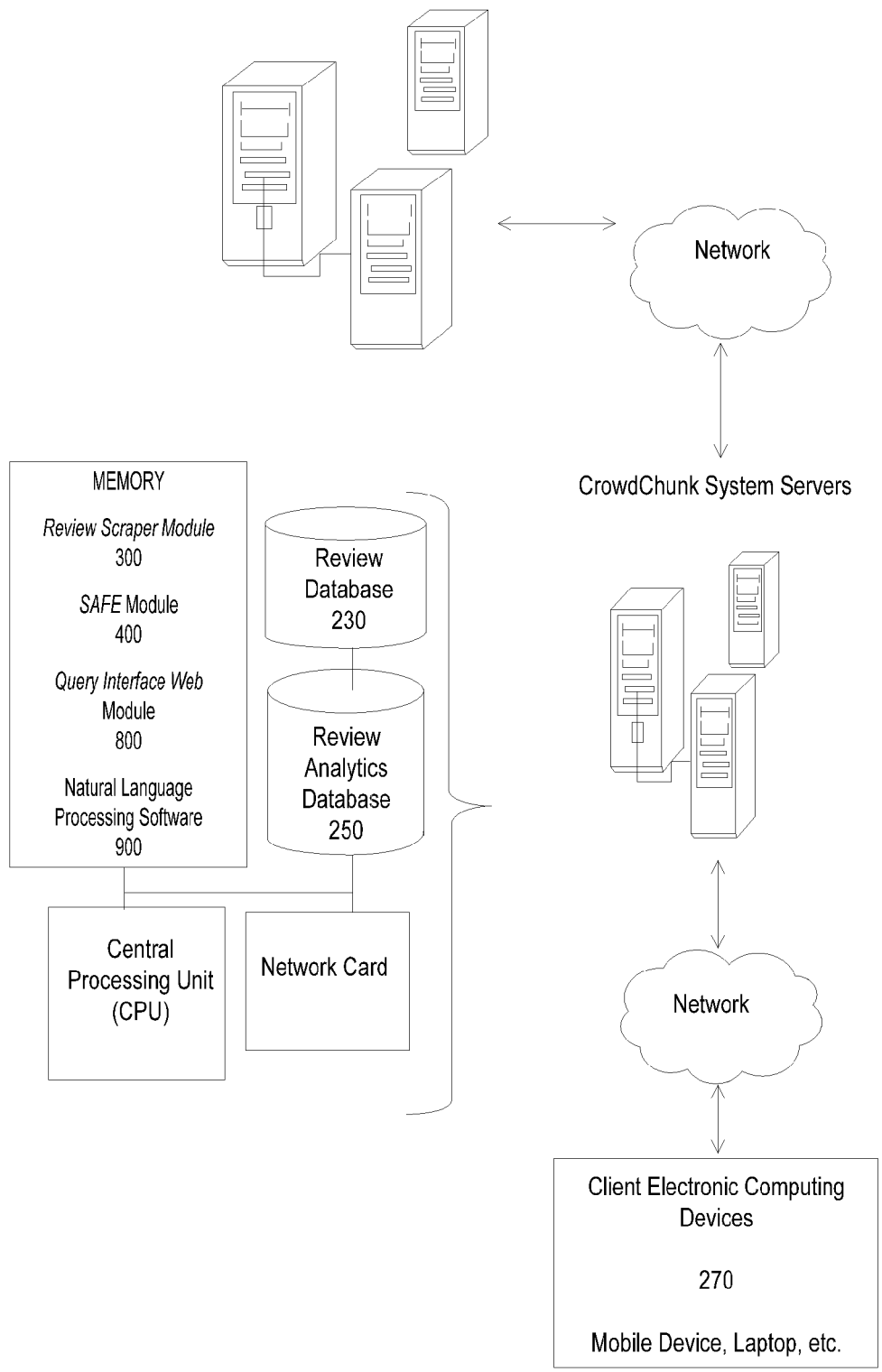
FIG. 2A is an illustration of the system architecture comprising the CrowdChunk system server in communication with the App's data sources and the client computing devices via the Internet.
Figure 2B:
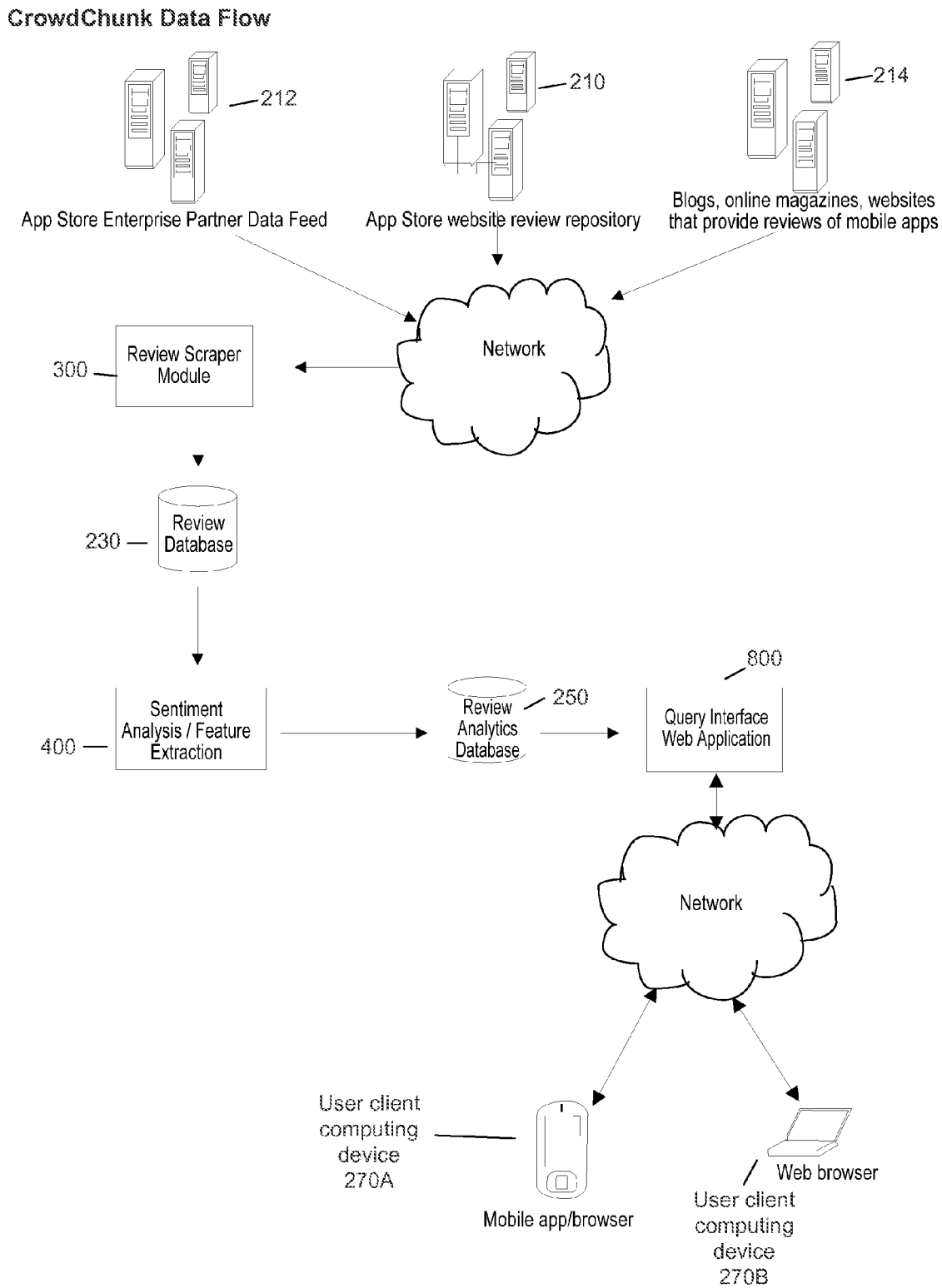
FIG. 2B is an illustration of data flow for one particular exemplification of FIG. 2A for pulling reviews from an App store website, processing them by the CrowdChunk system server, and then searching for and viewing analyzed summaries of the reviews on a user's electronic computing device.

FIG. 2A is a schematic diagram of the client-server system architecture of the present invention, and FIG. 2B is an illustration of the data flow from the exemplified App's store, through processing on the system server, to searching and viewing by the user on a client computing device. The software and the computer program product of the present invention may comprise a cloud version and/or a hybrid version that uses cloud computing and conventional servers.

As illustrated in FIGS. 2A and 2B, the source of the app reviews comprise: 1) an app store website review repository (210); 2) an app store enterprise partner data feed (212); and, 3) various online sources that provide reviews of mobile apps, such as blogs, online magazines, articles, websites that (214). Data from the app review sources 210, 212, 214 are downloaded via a network (e.g. Internet) to the CrowdChunk system server, which comprises one or multiple high speed CPU's (Central Processing Unit(s), primary memory (i.e. RAM), secondary storage device(s) (i.e. hard disk drives), and a means to connect the server with the network (e.g. a network card). The primary memory of the server also comprises the Review Scraper Module 300, the Sentiment Analysis Feature Extraction (SAFE) Module 400, the Query Interface Web Application 800, and natural language processing software 900 (e.g. Freeling™—an open source natural language processing tool suite). The databases on the system server comprise the Review Database 230 for storing the pre-processed reviews pulled from the primary data source (e.g. source 210, 212, and 214), and the Review Analytics Database 250 for storing the SAFE processed users' reviews.

The module and application programs, operating system and the database management programs may all run on the same computing device as in a traditional "main frame" type of configuration or several, individual yet interconnected computing devices as in a traditional "multi-tier client-server" configuration, as is well known in the art. The server system is coupled to the remote network (such as the Internet). The server system executes a (or multiple depending on the server system configuration) server program(s). The server system and the client program have communications facilities to allow client computers to connect to and communicate with the server program(s) such that the server program(s) can communicate with and exchange information with a multiplicity of user's client programs.

The User's client computing device may connect to the network via a variety of methods such as a phone modem, wireless (cellular, satellite, microwave, infrared, radio, etc.) network, Local Area Network (LAN), Wide Area Network (WAN), or any such means as necessary to communicate to the CrowdChunk system server connected directly or indirectly to the network (i.e. the Internet).

A user client computing device 270 comprises an electronic computing device with web browser capabilities, such as a mobile communications device, a desktop, a laptop, a netbook, and a mobile phone device (i.e. smartphone), etc. The user's client computing device is configured to communicate with the system server via the Internet to enable users to access the Query Interface Web Application 800 to search for and view summaries and metrics of apps reviews by multiple reviewers.

Computer Program Product

In an alternative embodiment, the users' client computing devices 270 may comprise a mobile electronic computing device (e.g. smartphone, tablet, etc.) with a computer program product of the present invention (e.g. "Query Interface Mobile App" module) installed within the device's memory so as to perform all or part of the functions of the present invention for researching the analytic summaries and metrics computed by the CrowdChunk system server's CPU.

The computer program product ("App") of the present invention may comprise a native application, a web application, or a widget type application to carry out the methods of graphically displaying the age (i.e. the duration since the last viewing) of content on a computing device screen. In a preferred embodiment, a native application is installed on the device, wherein it is either pre-installed on the device or it is downloaded from the Internet. It may be written in a language to run on a variety of different types of devices; or it may be written in a device-specific computer programming language for a specific type of device. In another embodiment, a web application resides on the system server and is accessed via the network. It performs basically all the same tasks as a native application, usually by downloading part of the application to the device for local processing each time it is used. The web application software is written as Web pages in HTML and CSS or other language serving the same purpose, with the interactive parts in Javascript or other language serving the same purpose. Or the application can comprise a widget as a packaged/downloadable/installable web application; making it more like a traditional application than a web application; but like a web application uses HTML/CSS/JavaScript and access to the Internet.

In a preferred embodiment, all client electronic computing devices 270, will access the Query Interface web application, wherein the web app will deliver html pages optimized for each type of client platform. For example, iOS users will see rendered html pages optimized for navigation by the mobile device, laptop/PC users will see rendered html pages optimized for standard navigation by these respective devices based on the type of browser being used (standard detection of Internet Explorer, Google Chrome, Firefox, etc.). Additionally for iOS devices, the user will retrieve a downloadable app via the Internet to their mobile device so that s/he can easily access the CrowdChunk web app from an icon on their mobile device. This makes it easier than requiring the user to load the web browser and retrieve a bookmarked URL to the web app, but like a web application the downloadable app uses HTML/CSS/JavaScript and accesses the Internet. Likewise, laptop/PCs will always access the CrowdChunk web app via a standard browser.

The flow of data from the primary data sources of multiple users' reviews and review types (e.g. 210, 212, and 214) to the viewing by user on their client electronic computing devices 270 is illustrated in FIG. 2A, and on user client computing devices 270A and 270B in FIG. 2B and further disclosed infra.

Reviewer Scraper Module

The "Reviewer Scraper" (FIGS. 2A and 2B, 300) comprises an software module stored on the CrowdChunk system server and executed by the system CPU for the purpose of retrieving users' reviews from online data sources (e.g. App stores, blogs, online magazines and web sites, etc.). The Review Scraper module causes the system server to submit an HTTP request message to the server of the online data source (e.g. App store) 210, 212, 214, to pull all reviews for all apps, then process and store them in the Review Database 230 for use by the Sentiment Analysis and Feature Extraction (SAFE) module 400.

Figure 3A:
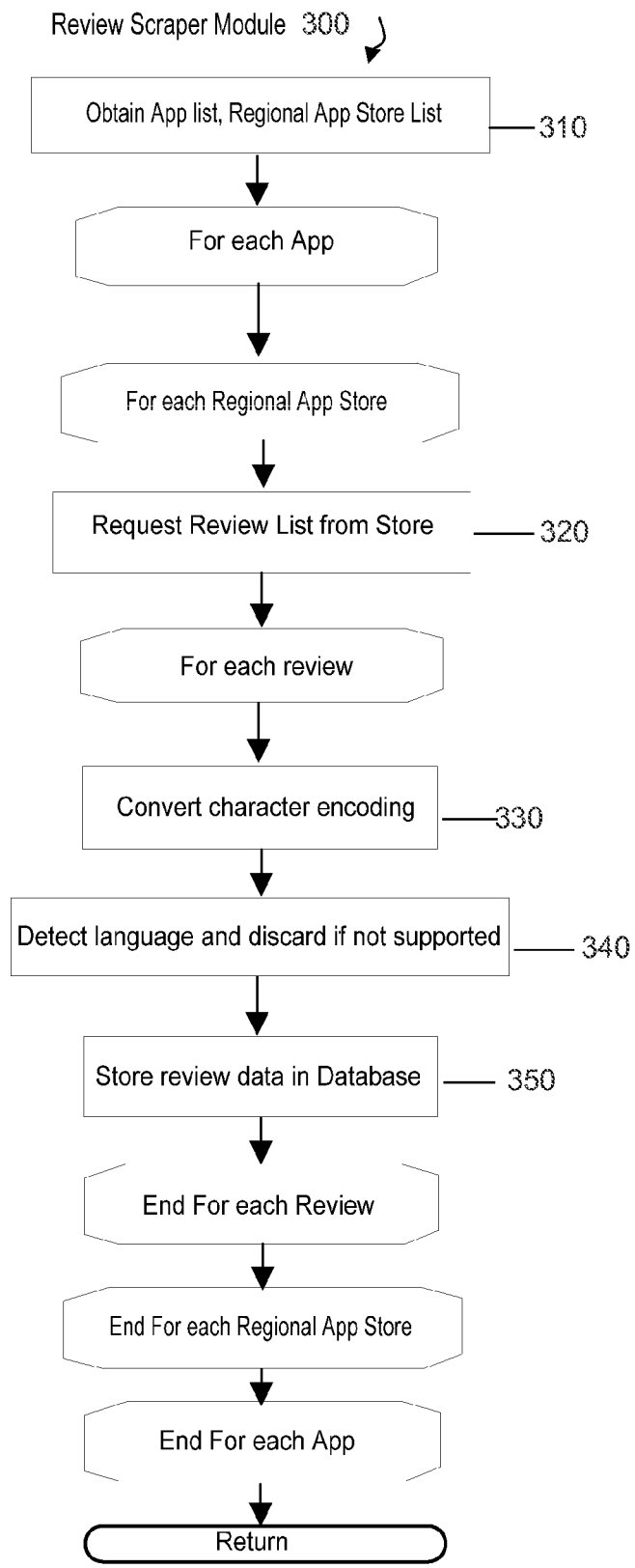
FIG. 3A is a flowchart of computer steps for the Review Scraper module.
Figure 3B:
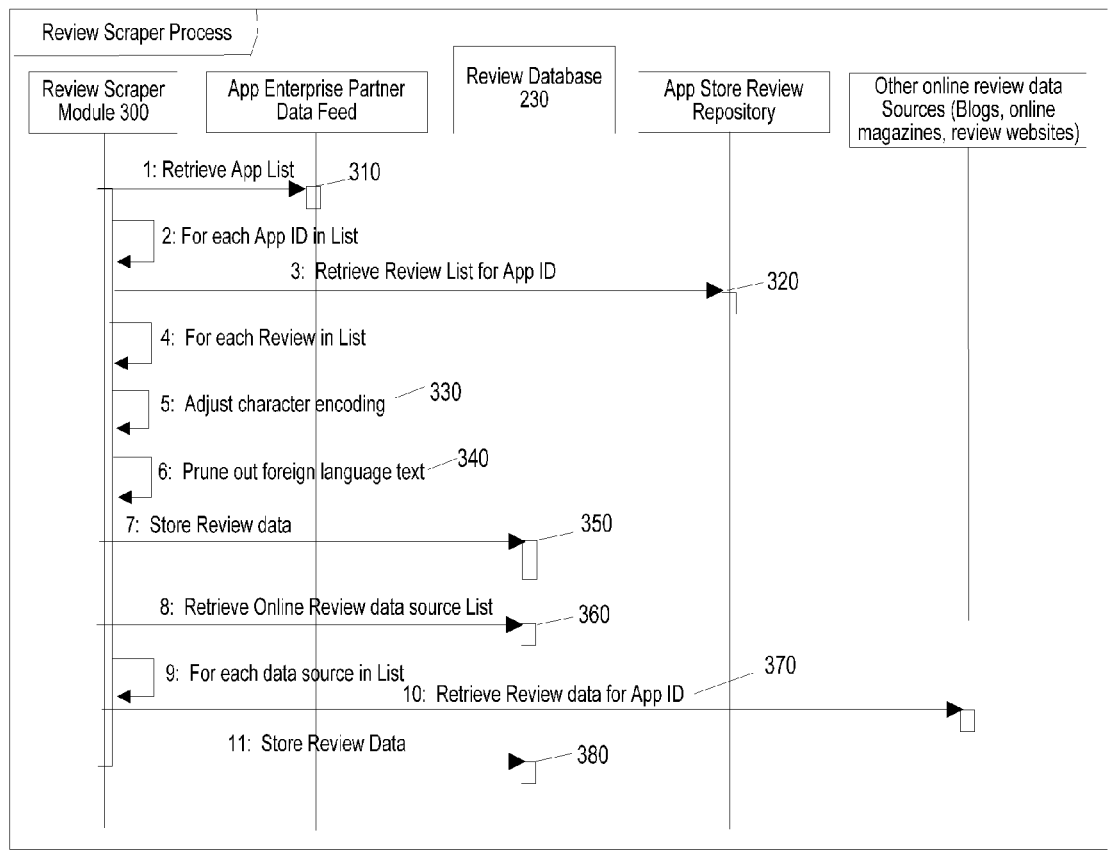
FIG. 3B is a Unified Modeling Language (UML) sequence diagram for the steps followed by the Review Scraper module.

As detailed for a preferred embodiment of an apps online store in the flowchart for FIG. 3A, and the corresponding UML sequence diagram for all types of apps sources in FIG. 3B, the Reviewer Scraper process starts with retrieving an App List from the app source (e.g. App Enterprise Partner Data Feed, and the App Store website review repository, as illustrated in FIG. 3A, step 310, and FIG. 3B, steps 310 and 320), (see also FIGS. 2A and 2B, 210, 212, 214). In a preferred embodiment comprising pulling apps from the Apple App Store, the CrowdChunk system server will receive the App List comprising all apps in the App Store 210 via Apple's Enterprise Partner feed 212. (The Enterprise Partner Feed—EPF—is a data feed of the complete set of metadata from iTunes and the App Store. It is available for affiliate partners to fully incorporate aspects of the iTunes and App Store catalogs into a web site or app. The EPF is available in two different formats—either as the files necessary to build a relational database or as stand-alone flat files that are country and media dependent.) This list will be refreshed periodically as new Apps are submitted to the app store frequently and this list grows over time.

As per step 330, for each review retrieved from the repository, the CPU will adjust or convert the character encoding of all reviews from ISO/IEC 8859-1 to UTF-8 to ensure compatibility with the Freeling module used in analytics processing. The system server will then remove all foreign language and other text if it is not translatable by the Scraper (step 340). The "edited" review is then stored in the Review database 230 (step 350), and the process is repeated for each review retrieved from the App store in step 320. The system will then repeat steps 330-350 for each review pulled from each regional App store.

The Review Scraper module 300 may also retrieve reviews of Apps from other data sources as illustrated in FIG. 3B, steps 360-380. As per step 360, the Scraper algorithm retrieves online review data source lists from the online reviews for Apps, such as blogs, online magazines and web sites. The data source list is compiled and managed by CrowdChunk system administrators. In step 370 of FIG. 3B, for each data source on the list, the Review Scraper module causes the CrowdChunk system server and the CPU to retrieve the review data for the particular App identified in step 320. And in step 380 of FIG. 3B, the review data for the identified App is then stored in the Review database 230.

Sentiment Analysis and Feature Extraction (SAFE) Module

Figure 4A:
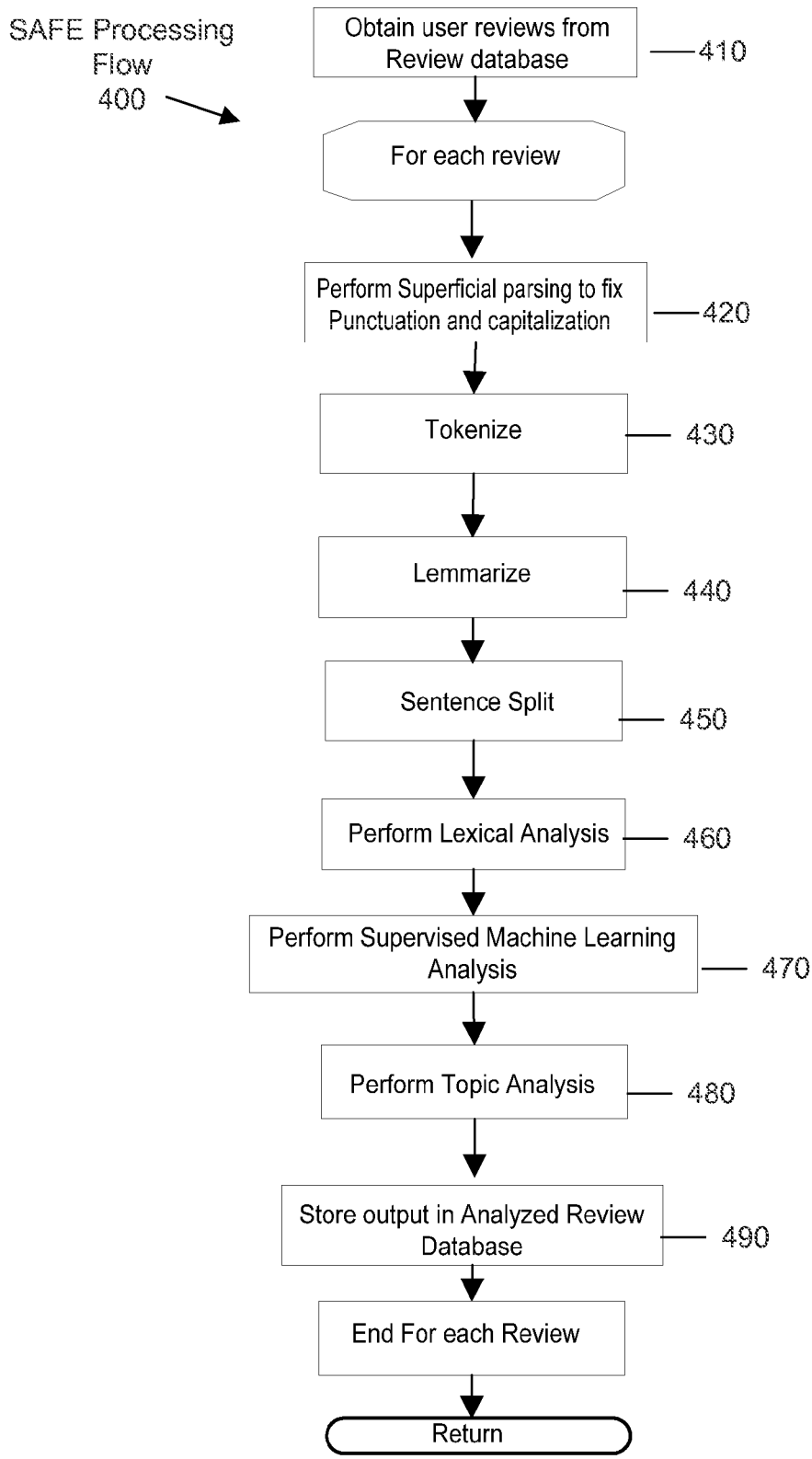
FIG. 4A is a flowchart of computer steps for the Sentiment Analysis Feature Extraction (SAFE) Module.
Figure 4B:
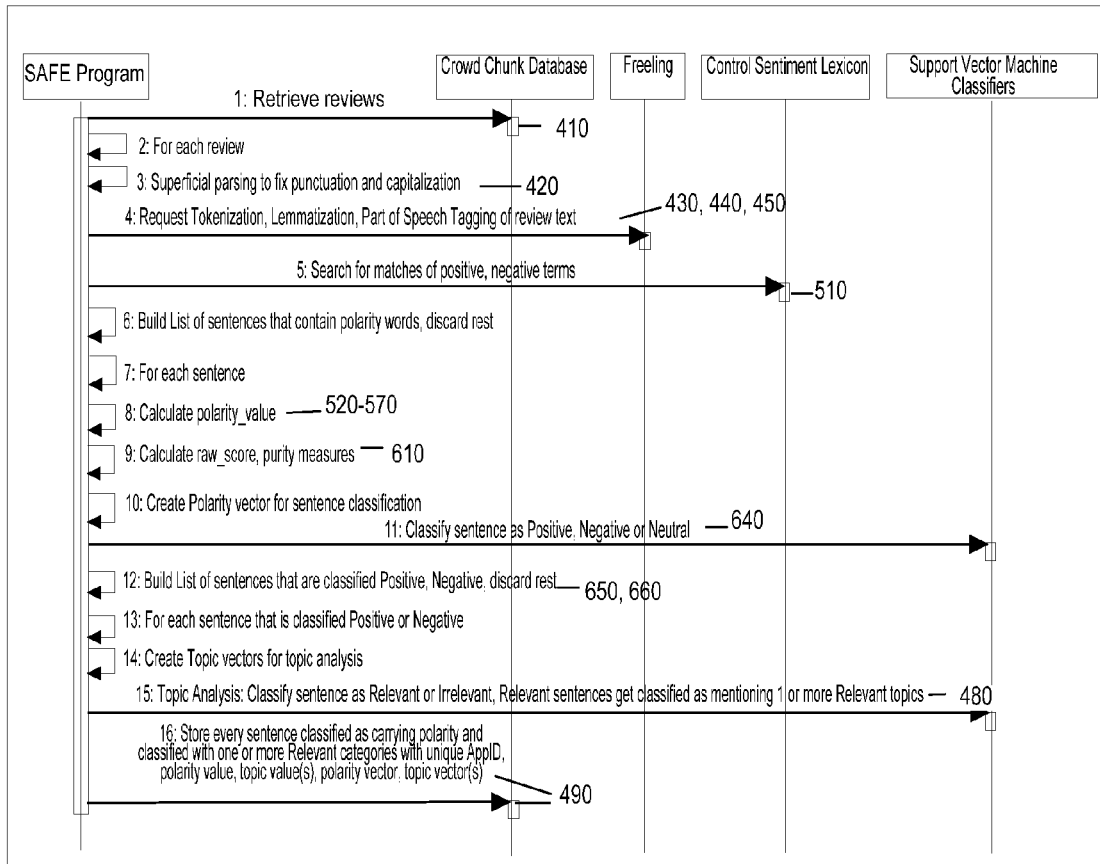
FIG. 4B is a Unified Modeling Language (UML) sequence diagram for the steps flowed by the Sentiment Analysis Feature Extraction (SAFE) Module.

The SAFE module analyzes the reviewers' evaluations stored in the Review database 230 via the flowchart steps shown in FIG. 4A, and the corresponding UML sequence diagram in FIG. 4B. As per step 410, the CrowdChunk server retrieves users' reviews stored in the Review database 230 for all apps listed in the App list. For each review pulled from the Review database 230, the SAFE module performs superficial parsing to fix punctuation and capitalization of the text within the review (step 420) to enable natural language processing software to recognize sentences. In a preferred embodiment, the Freeling natural language processing software is utilized, although it would be readily apparent to the skilled artisan how and which other types of language processing software to use with the present invention, such as LingPipe, CLAWS, Tnt, and MorphAdorner.

The CPU of the CrowdChunk server subsequently performs part-of-speech tagging on the review text processed in step 420 utilizing the language processing software. The process comprises marking up a word in a text of the review as corresponding to a particular part of speech (e.g. noun, verb, adjective, etc.) based upon its common known definition, as well as its context within the review, such as its relationship with adjacent and related words in a phrase, sentence, or paragraph within the review. In order to accomplish this, the natural language processing software performs tokenization (step 430) and lemmatization (step 440). During tokenization, the stream of text within the review is broken up into words, phrases, symbols and other elements known as "tokens". During lemmatization, the CPU determines the "lemma" of the words within the review, which is the canonical, dictionary, or citation form of a set of words (e.g. "run" is the lemma for runs, ran, running). The CPU performs an additional step, sentence splitting (step 450), during which the tokenized text is assembled with the help of the POS-tags assigned to it into sentences for use in step 460—Lexical Analysis.

By way of exemplification for steps 430-450: Freeling is loaded into the CrowdChunk system server memory by executing it in the server mode: (analyze -f /usr/local/share/freeling/config/en.cfg —nonec —nonumb —noner —noloc —noquant —nodate —flush —server —port 50005 &). Then every review that is output by the preprocessing step described in step 420 is sent to the Freeling process running in server mode in order to POS-tag it. Freeling output is parsed and structured as follows: 1) one list of lists with the tokenized words of every sentence in the review; 2) one list of lists with the tokenized lemmas of every sentence in the review; and 3) one list of lists with the tokenized POS-tags of every sentence in the review.

Figure 5:
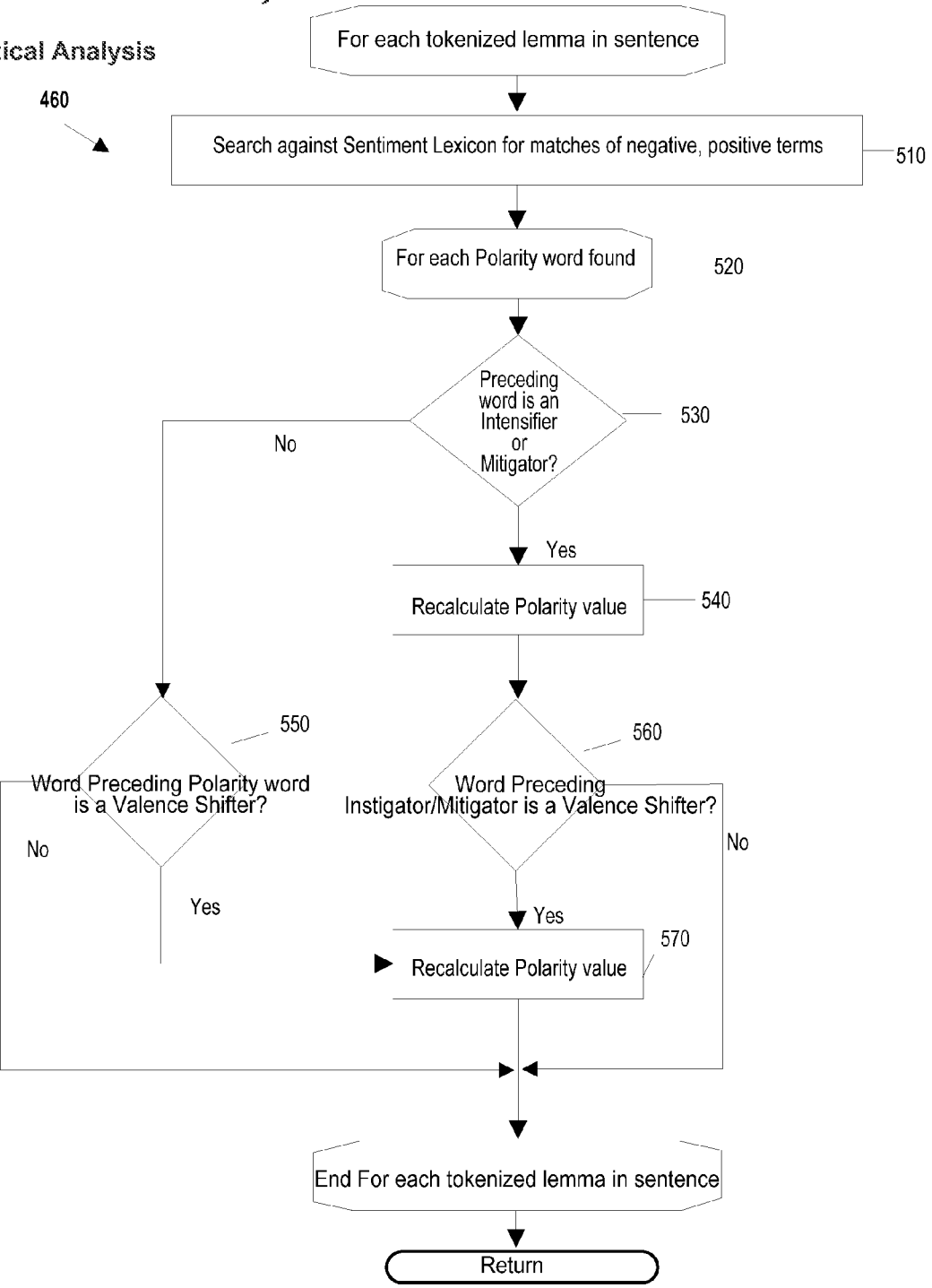
FIG. 5 is a detailed flowchart of computer steps followed during the Lexical Analysis step of the SAFE module.
Figure 6:
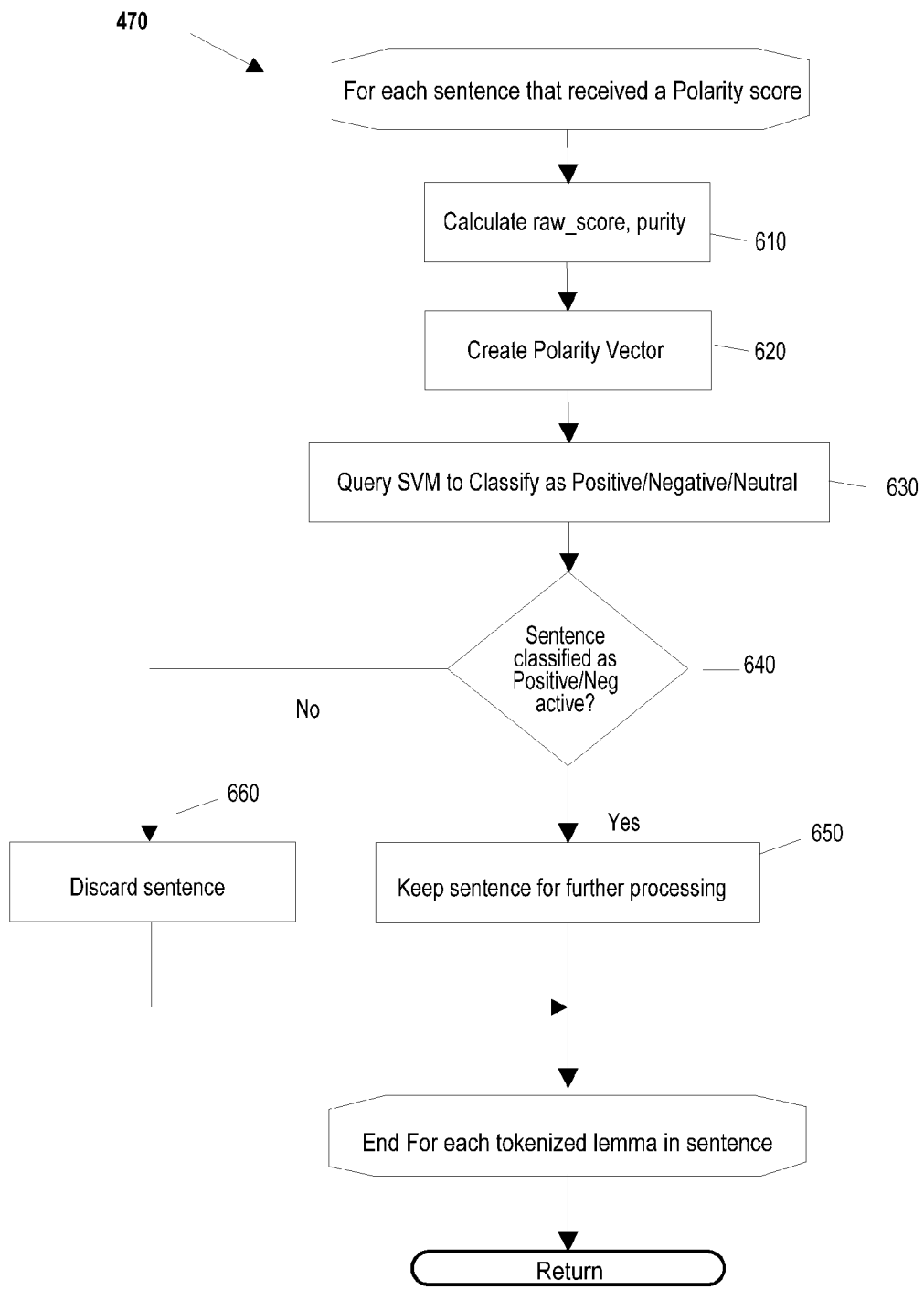
FIG. 6 is a detailed flowchart of computer steps followed during the Supervised Machine Learning Analysis step of the SAFE module.

After processing the reviews by the natural language software 900, sentiment-lexical analysis is performed on the output in step 460—Lexical Analysis (see the flowchart in FIG. 5), and step 470—Supervised Machine Learning Analysis (see the flowchart in FIG. 6). To initiate the Lexical Analysis, a controlled sentiment lexicon is created manually. This lexicon includes English lemmatized nouns, verbs, adjectives and adverbs that are manually labeled as either carrying positive or negative polarity (e.g. positive review or negative review of App). A controlled list of English intensifiers, mitigators and valence shifters is manually compiled. Intensifiers are words that amplify the meaning of the word they modify (e.g. "very", "greatly", etc.). Mitigators are words that mitigate the meaning of the word they modify (e.g. "mildly", "barely", etc.). And valence shifters are words that revert the meaning of the word they modify (e.g. "not", "no", etc.). The mitigators and intensifiers are manually assigned a value that represents their mitigation or intensification power.

As illustrated in FIG. 5, the Lexical Analysis Sub-Module 460 then analyzes the list of tokenized lemmas for every sentence outputted by the sentence split processing described in step 450 in order to find matches of the negative and positive terms in the sentiment lexicon created supra (FIG. 5, step 510). To calculate the polarity value, occurrences of negative terms get assigned a value of −1 and positive ones, a value of 1 (step 520). For each of these occurrences, the word that precedes them is searched in the intensifiers and mitigators list (step 530). If no intensifier or mitigator is found preceding a polarity word, the preceding word is checked to determine whether it is a valence shifter or not (step 550). If it is a valence shifter, the polarity value of the matched sentiment word is recalculated as follows: (polarity_value=polarity_value*−1) (step 570).

If an intensifier or mitigator was found in step 530, then the polarity value of the matched sentiment word is recalculated as follows: (polarity_value=polarity_value+(polarity_value*intensification/mitigation_value)) (step 540)., the word that precedes the intensifier/mitigator is checked to determine whether it is a valence shifter or not (step 560). If it is a valence shifter, the polarity value resulting from taking into account the intensification/mitigation is shifted as described by the previous formula: (polarity_value=polarity_value*−1) (step 570). After this process is completed, a list of sentences that contain polarity words gets extracted. The rest of sentences that did not match any polarity term get discarded.

The sentences containing polarity words from the Lexical Analysis Sub-Module 460 are then fed into the Supervised Machine Learning Module (FIG. 4A, step 470) for which the flowchart of steps is found in FIG. 6. For each of these sentences a set of measures is calculated by the CrowdChunk CPU in step 610: 1) "raw_score", which is the score that results from adding all the values of the identified lexical occurrences; and 2) "purity", which represents the ratio ("raw_score"/(absolute_score)), wherein "absolute_score" is calculated by adding the absolute value of all the values of the identified lexical occurrences.

Once the "raw score" and "purity" value for a review are calculated by the CPU, the SAFE module (and the Supervised Machine Learning subroutine) creates a "polarity vector" for each sentence in a review that contains the following dimensions (step 620), wherein "−1" means the previous sentence, and "+1" means the next sentence:

x0=sentence raw score
x1=sentence purity score
x2=sentence−1 raw score
x3=sentence−1 purity score
x4=sentence−1 absolute raw score
x5=sentence−1 objectivity
x6=sentence+1 raw score
x7=sentence+1 purity score
x8=sentence+1 absolute raw score
x9=sentence+1 objectivity
x10=review raw score
x11=review purity
x12=review user assigned star Annotations "x5" and "x9" refer to a value that is recorded when matching polarity terms from the lexicon in every sentence. If no polarity term gets matched, the sentences get assigned a value of 0, otherwise it gets assigned a value of 1 in order to keep track of neutral sentences found in the review. Annotations "x10" and "x11" are calculated as follows:

x10: sum of the raw score of all the sentences in a review
x11: sum of the purity score of all the sentences in a review Once vectors "x0" through "x12" have been created for every sentence in a review, the Supervised Machine Learning subroutine proceeds to classify each potential candidate sentence as Positive, Negative or Neutral (step 630). This classification is achieved using a Support Vector Machine (SVM) classifier, which was previously trained using a manually labeled set of sample sentences processed by the Lexical analysis module (step 640). Sentences classified by the SVM as either Positive or Negative are kept for further processing (step 650). Sentences classified as Neutral get discarded (step 660).

Figure 7:
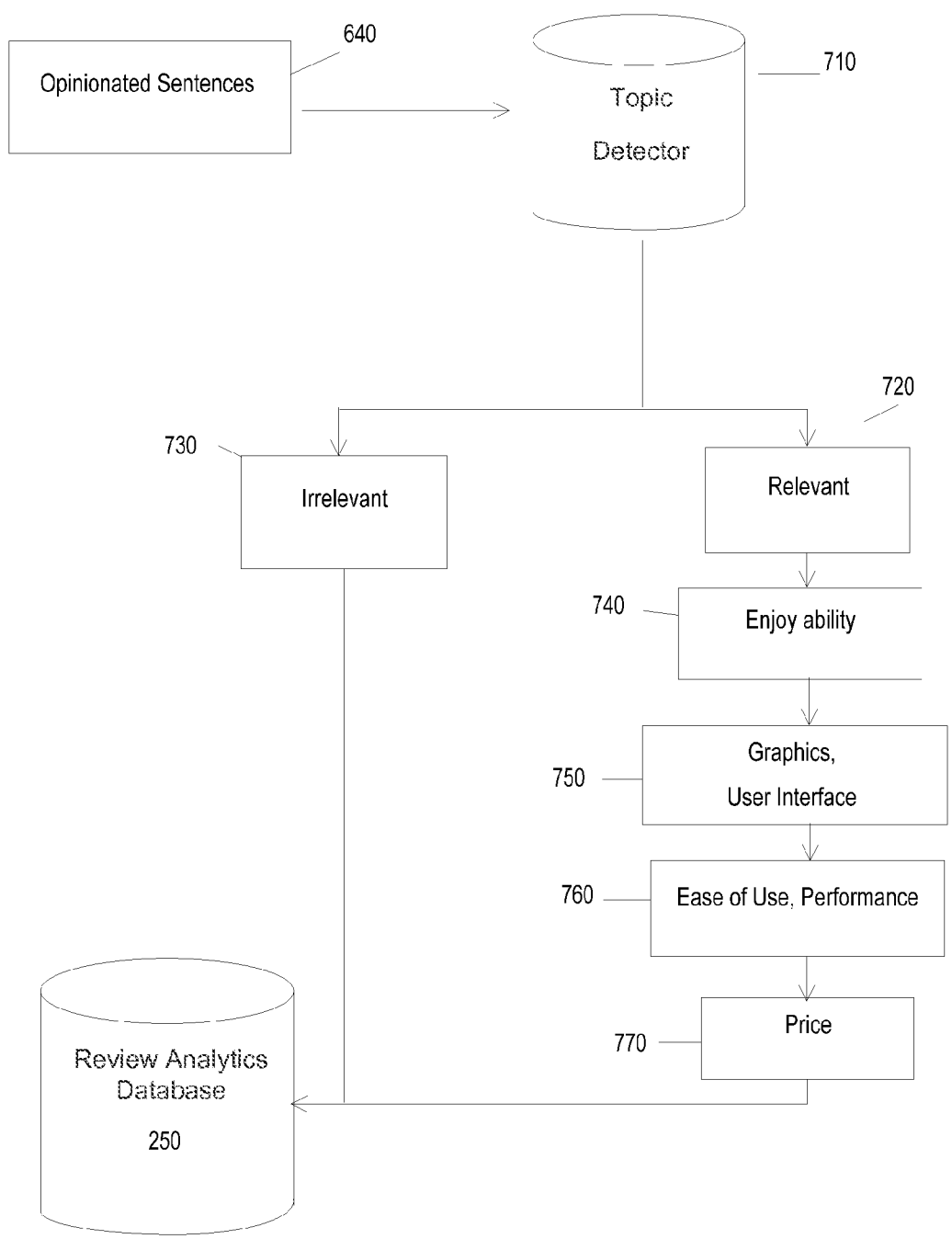
FIG. 7 is a detailed flowchart of the computer steps followed during the Machine Learning Topic Detection.

Following Supervised Machine Learning subroutine 470, the SAFE module performs the "Topic Analysis" subroutine (FIG. 4A, step 480). During Topic Analysis each sentence identified as negative or positive in step 640 is further analyzed by a set of Support Vector Machine classifiers to determine the topics that it mentions as illustrated in FIG. 7. Exemplified topics were defined as a hierarchy as follows, although it is recognized that the skilled artisan could readily select alternative topics:

Irrelevant
Relevant
  Enjoy ability
  Graphics/UI
  Ease of use/Performance
  Price Each sentence identified as negative or positive in step 640 is matched against a set of precompiled lists of lexical features (e.g. Topic Detector Database 710) and transformed into a series of vectors for each of the SVM classifiers to process them. The precompiled lists of lexical features were created during the training stage by analyzing and comparing the set of words that tend to occur more prominently for each of the topic categories. Classifiers were trained using a manually labeled set of sentences to make the following distinctions:

Irrelevant vs. Relevant
Enjoy ability vs. Non-enjoy ability
Graphics/UI vs. Non-Graphics/UI
Ease of use/Performance vs. Non-Ease of use/Performance
Price vs. Non-Price With this set of classifiers sentences get classified as being "Relevant" 720 or "Irrelevant" 730. If they get classified as "Relevant" 720, then they get classified as mentioning any of the topics listed under "Relevant" in the hierarchy supra (i.e. Enjoy ability 740, Graphics/UI 750, Ease of use/Performance 760, and Price 770). Finally, every sentence is classified as carrying polarity and classified with one or more of the categories under "Relevant", and is stored along with its unique application ID (AppID), polarity value, topic value(s), polarity vector and topic vector(s) in the Review Analytics Database 250 to be used as a data source for the Query Interface Web Application 800 (see FIG. 2B).

Query Interface Web-Based Application

From one or more of the user client computing devices 270A and 270B in FIG. 2B, the user may search for and view the SAFE processed reviews by navigating via the Internet to a web-hosted site displaying the Query Interface Web Application 800. It is also noted that the user may interact with the Query Interface Web Application by utilizing the computer product of the present invention installed as an App on user client computing device 270A.

The Query Interface Web Application 800 enables the user to search for Apps based on its commercial name or category of use or tangible item (i.e. Games, Productivity tools, Cameras, etc.). Upon the user entering a search for a particular App or a category of App's, the Query Interface Web Application will retrieve any pertinent information stored on the Crowd-Chunk server's Review Analytic Database 250 in FIG. 2B and display it on the user's GUI. The display may comprise a variety of formats to disclose the users' reviews extracted from various data sources and processed by the SAFE module. In a preferred embodiment, the user's display may comprise the following features for a search, summary, and a detailed page of analytics for each App:

1) Request Search Page:
    a) Search text entry field; and,
    b) A list of links to categories and/or pre-canned search filters (e.g. "What's Trending", "All-time Greats", "On Sale", etc.);
2) Search Summary Page:
    a) Search text entry field at top with drop down select lists for iPhone/iPad, Free/Paid, and Category lists;
    b) Search results displayed in 3×3 grid with numbered links to other pages of results; and,
    c) Each App in result group with its Name, Price, Icon, 0-5 star rating, count of ratings, screen shot, link to iTunes® and link to "Info & Reviews" (see infra).
3) "Info and Reviews" Page:
    a) Search field at top;
    b) App information row below (i) comprising App's Icon, Name, Screen Shots, link to iTunes®;
    c) Collate feature comprising: a list of 3 pull quotes culled from user reviews along with a sentence like, "[x] users out of [y] made a similar statement." Each quote has link to the Review Detail Page;
    d) A list of features extracted from reviews with average score next to them (e.g. Graphics 80% positive, Easy to Use 60% positive, Fun factor 40% positive);
    e) The most positive/negative reviews: list of 2 pull quotes culled from users that system determines are most positive/negative (e.g. "Most positive review: 'review content'", "'Most negative review: 'review content'"); and,
    f) A link to review feed, with some choices for how to order the results by, for example, the most recent/oldest date posted, by highest/lowest Graphics/Easy, highest/lowest Easy to Use, highest/lowest Fun Factor, etc.
4) A Review Detail Page (shown when user clicks on reviews from either the collate feature, most positive/negative quotes, or the Review Listing):
    a) Score for each feature extracted. For example, a very positive review may have: Graphics: Positive; Ease of Use: Positive; Fun Factor: Negative.
    b) Short cross-reference list of other Apps (with name/icon) that same reviewer gave a very positive review for extracted features (i.e. list contains reviews with ratings: Graphics Positive and/or Easy to Use: Positive and/or Fun Factor: Positive). Clicking on one of these brings up the Review Detail Page for this other App.
5) Pro Reviews Page (shown when user clicks on review from either a collate feature, most positive/negative quote, or the Review Listing):
    a) Listing of reviews extracted by Review Scraper from 'professional' data sources other than App store repository (e.g. Apple® review repository);
    b) Displays name of data source (blog, online magazine, website, etc.) with clickable link to the original review; and,
    c) Display review text.
6) An "App Review Cross-Referencing Positive" feature comprising a list of other apps that a reviewer who gave a high rating for the app of interest by the user, also gave a high rating to. If any app on the list is in the same category as the type of app the user is searching for, then the user is able to compare the features between the apps and possibly find another app with similar desirable features, at perhaps a better price and/or possessing additional, desirable features. This is accomplished by querying the Review Analytics Database for all highly rated apps reviewed by the same reviewers that gave the app of interest a high rating. The result set from this query contains all analytics results for each highly rated app, respectively, as required for display in the web application.
7) An "App Review Cross-Referencing Negative" feature comprising a list of other apps that a reviewer gave a positive rating for, while giving a negative rating to the app of interest by the user. By comparing the two, the user may be able to identify another app with improved performance and/or features as compared to the app that they were originally researching on the system. This is accomplished by querying the Review Analytics Database for all highly rated apps reviewed by the same reviewers that gave the app of interest a low rating. The result set from this query contains all analytics results for each highly rated app, respectively, as required for display in the web application.

It is noted that the outline supra is only one exemplification of the present invention's Query Interface Web Application's functionality. One of skill in the art would readily know of other ways to utilize the system of the present invention to prompt the user for search terms, then extract and present the SAFE processed information from the Review Analytics Database, as well as to perform other types of data analysis on multiple reviewers' summaries stored in the Review Database.

CONCLUSION

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The aforementioned flowchart and diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

What is claimed is:

1. A networked based computing system for retrieving, analyzing, and displaying multiple reviews of mobile application software configured for a user to search for and view analyzed summaries of the reviews, the system comprising:
    a) a system server, comprising;
        i. a central processing unit for retrieving, processing, and storing analyzed summaries of the reviews;
        ii. a review database for storing records of written reviews of mobile applications retrieved by the central processing unit;
        iii. a review analytics database for storing the records from the review database that are processed for use by a natural language processing module;
        iv. a natural language processing module for performing tokenization, lemmarization, and sentence splitting computing processes on the records of the written reviews;
        v. a review scraper module for retrieving users' reviews from online data sources, preprocessing them for compatibility with the natural language processing module, and storing them within the reviews database;
        vi. a sentiment analysis feature extraction processing module for processing the records of the written reviews stored within the reviews database to generate a profile for each mobile application comprising analytical summaries, and storing the profile within the review analytics database; and
        vii. a query interface web module to receive, over a network, a search request for a particular mobile application and/or class of mobile applications from a client computer, wherein the query interface web module provides the mobile application's profile and analytical summaries stored on the review analytics database to the client computer in response to the search request,
    wherein each analytical summary comprises a review detail webpage of the particular mobile application comprising:
        i. a score calculated by the central processing unit for features of the application that were reviewed, wherein said features are labeled either "positive" or "negative"; and
        ii. reviews of other cross-referenced applications that the central processing unit has determined: 1) were rated highly by a reviewer(s) who gave a positive rating to the application, and 2) were rated highly by reviewer(s) who gave a negative rating to the application.

2. The system of claim 1, wherein the online data sources for the reviews comprise: mobile application stores, blogs, online magazines and web sites.

3. The system of claim 1, wherein said analytical summaries further comprise one or more of:

a) a list of two or more quotes from the reviewers and displaying how many reviewers made a similar comment about the application;
b) a list of two or more quotes from the reviewers that the central processing unit has determined are the most positive and most negative comments about the application;
c) a list of features extracted from the reviews and displaying the average score of each feature as calculated by the central processing unit;
d) a professional reviews webpage listing reviews extracted from information technology professionals and links to the original review written by the professional.

4. The system of claim 3, wherein said features comprise: enjoy ability, graphics and user interface quality, ease of use and performance, and price.

5. The system of claim 1, wherein said reviews stored within the review database are preprocessed by the review scraper module directing the central processing unit to adjust and convert the review's character encoding to ensure compatibility with the natural language processing module, and to remove all foreign language and other text when it is not translatable.

6. The system of claim 5, wherein said review scraper module performs superficial parsing to fix punctuation and capitalization of the text within the reviews to enable the natural language processing software to recognize sentences.

7. The system of claim 1, wherein the sentiment analysis feature extraction processing module utilizes lexical analysis, supervised machine learning sentiment, and topic analysis to compute the analytical summaries.

8. The system of claim 7, wherein the sentiment analysis feature extraction processing module further directs the central processing unit to calculate the average score of the application's rated features.

9. A computer implemented method for retrieving, analyzing, and displaying reviews of mobile application software configured for a user to search for and view the analyzed summaries of the reviews, comprising processor(s) on a system server:
a) retrieving users' reviews from online data sources, preprocessing them for compatibility with a natural language processing module, and storing them within a reviews database;
b) processing the reviews stored within the reviews database using lexical analysis, supervised machine learning sentiment, and topic analysis to generate a profile for each mobile application, and storing the profile within a review analytics database;
c) searching the profiles stored on the review analytics database based on a request from a user on their electronic computing device, and associating analytical summaries of features of the mobile application with the profile for the mobile application; and,
d) transmitting the application to the user's electronic computing device based on receiving the user's selection of a link within the mobile application's profile,
wherein said analytical summaries comprise a review detail webpage for each application displaying:
i. a score calculated by the central processing unit for features of the application that were reviewed, wherein said feature is labeled either "positive" or "negative" and comprise enjoy ability, graphics and user interface quality, ease of use and performance, and price; and,
ii. reviews of other cross-referenced applications that the central processing unit has determined: 1) were rated highly by a reviewer(s) who gave a positive rating to the application; and 2) were rated highly by reviewer(s) who gave a negative rating to the application.

10. The computer implemented method of claim 9, wherein the online data sources for the reviews comprise: mobile application stores, blogs, online magazines and web sites.

11. The computer implemented method of claim 9, wherein said analytical summaries comprise a list of two or more quotes from the reviewers and displaying how many reviewers made a similar comment about the application.

12. The computer implemented method of claim 9, wherein said analytical summaries comprise a list of two or more quotes from the reviewers that the central processing unit has determined are the most positive and the most negative comments about the application.

13. The computer implemented method of claim 9, wherein said analytical summaries comprise a list of features extracted from the reviews and displaying the average score of each feature as calculated by the central processing unit, wherein said features comprise: enjoy ability, graphics and user interface quality, ease of use and performance, and price.

14. The computer implemented method of claim 9, wherein said analytical summaries comprise a professional reviews webpage listing reviews extracted from information technology professionals and links to the original review written by the professional.

15. A computer program product embodied in a non-transitory computer readable medium that, when executing on one or more computers, performs the steps of:
a) retrieving users' reviews from online data sources, preprocessing them for compatibility with a natural language processing module, and storing them within a reviews database;
b) processing the reviews stored within the reviews database using lexical analysis, supervised machine learning sentiment, and topic analysis to generate a profile for each mobile application, and storing the profile within a review analytics database, wherein the profile comprises analytical summaries of features of the mobile application;
c) searching the profiles stored on the review analytics database based on a request from a user on their electronic computing device, and providing analytical summaries of features of the mobile application to the electronic computing device; and,
d) transmitting the application to the user's electronic computing device based on receiving the user's selection of a link within the mobile application's profile
wherein the analytical summaries viewed by the user on their mobile electronic computing device comprises a review detail webpage for each application displaying:
i. score calculated by the central processing unit for features of the application that were reviewed, wherein said features are labeled either "positive" or "negative" and comprise enjoy ability, graphics and user interface quality, ease of use and performance, and price; and,
ii. reviews of other cross-referenced applications that the central processing unit has determined: 1) were rated highly by a reviewer(s) who gave a positive rating to the application; and 2) were rated highly by reviewer(s) who gave a negative rating to the application.

16. The computer program product of claim 15, further comprising a mobile application running on a user's mobile electronic computing device configured for the user to search for and view the profiles of mobile applications stored on the review analytics database.

17. The computer program product of claim 16, wherein the analytical summaries viewed by the user on their mobile electronic computing device comprises one or more of:
   a) a list of two or more quotes from the reviewers and displaying how many reviewers made a similar comment about the application;
   b) a list of two or more quotes from the reviewers that the central processing unit has determined are the most positive and most negative comments about the application; and,
   c) a list of features extracted from the reviews and displaying the average score of each feature as calculated by the central processing unit, wherein said features comprise enjoy ability, graphics and user interface quality, ease of use and performance, and price.

18. The computer program product of claim 16, wherein the analytical summaries viewed by the user on their mobile electronic computing device comprises a professional reviews webpage listing reviews extracted from information technology professionals and links to the original review written by the professional.

\* \* \* \* \*